United States Patent
McNeil

(12)
(10) Patent No.: US 6,244,218 B1
(45) Date of Patent: Jun. 12, 2001

(54) AQUATIC STRUCTURE AND METHOD

(75) Inventor: Roderick J. McNeil, Polson, MT (US)

(73) Assignee: Marine Environmental Solutions L.L.C., Calverton, MD (US)

(*) Notice: Subject to any disclaimer, the term of this patent is extended or adjusted under 35 U.S.C. 154(b) by 0 days.

(21) Appl. No.: 09/377,867

(22) Filed: Aug. 20, 1999

(51) Int. Cl.$^7$ .............................. A01K 61/00; E02B 3/04
(52) U.S. Cl. .............................. 119/223; 119/221; 405/24
(58) Field of Search .................................. 119/221, 223, 119/237, 239, 622, 660, 661; 49/34; 405/24, 26, 28

(56) References Cited

U.S. PATENT DOCUMENTS

| | | | |
|---|---|---|---|
| 3,071,111 | * | 1/1963 | Hamilton ............................. 119/661 |
| 3,299,640 | | 1/1967 | Nielsen ............................... 119/221 |
| 3,540,415 | | 11/1970 | Bromley ............................. 119/221 |
| 3,559,407 | | 2/1971 | Schuur . |
| 3,590,585 | | 7/1971 | De Winter . |
| 3,820,339 | | 6/1974 | Luque .................................. 405/24 |

(List continued on next page.)

FOREIGN PATENT DOCUMENTS

| | | |
|---|---|---|
| 1811506 | 7/1969 | (DE) . |
| 1176772 | 1/1970 | (GB) . |
| 1385974 | 3/1975 | (GB) . |
| 54-70989 | 6/1979 | (JP) . |
| 07307326 | 6/1997 | (JP) . |
| WO 85/03539 | 8/1985 | (WO) . |

Primary Examiner—Charles T. Jordan
Assistant Examiner—Elizabeth Shaw
(74) Attorney, Agent, or Firm—Dickstein Shapiro Morin & Oshinsky LLP

(57) ABSTRACT

A structure is provided for promoting growth of aquatic species for aquaculture operations and other purposes. The aquatic structure may have a buoyant member, a flexible sheet, and flexible strips (such as fronds, ribbons or filaments). The flexible materials are suspended from the buoyant member. The flexible materials may have high surface area structures for promoting growth of autotrophic (including algae) and heterotrophic organisms (such as bacteria) in photic and heterotrophic sections, respectively. The autotrophs and the bacteria are food, and the dispersed flexible strips provide an attractive habitat for the larger feeding organisms such as fish, crustaceans and mollusks. Ballast devices may be used, if desired, to secure the aquatic structure to the benthos. The ballast devices may be formed of flexible material. The flexible ballast devices may be filled with granular material after the apparatus is transported to the job site. The aquatic structure is easy to handle and deploy in aquatic environments. In alternative embodiments of the invention, additional float devices and/or tethered anchors may be provided for maintaining the apparatus in the desired location.

32 Claims, 3 Drawing Sheets

U.S. PATENT DOCUMENTS

| | | | |
|---|---|---|---|
| 3,841,266 | 10/1974 | Hoshino | 119/221 |
| 4,130,994 | 12/1978 | Van Moss, Jr. | 405/24 |
| 4,221,500 | 9/1980 | Garrett | 405/24 |
| 4,337,007 | 6/1982 | Smith | 405/24 |
| 4,374,629 | 2/1983 | Garrett | 405/24 |
| 4,437,786 | 3/1984 | Morrisroe | 405/24 |
| 4,441,453 | 4/1984 | McMickle et al. | 119/223 |
| 4,478,533 | 10/1984 | Garrett | 405/24 |
| 4,490,071 | 12/1984 | Morrisroe | 405/24 |
| 4,534,675 | 8/1985 | Morrisroe | 405/24 |
| 4,641,997 | 2/1987 | Lauer et al. | 405/24 |
| 4,657,432 | 4/1987 | Rentrop et al. | 119/256 |
| 4,699,829 | 10/1987 | Willinger | 405/25 |
| 4,722,639 | 2/1988 | Alsop | 119/223 |
| 4,818,579 | 4/1989 | Uchida | 405/24 |
| 4,950,104 | 8/1990 | Streichenberger | 405/25 |
| 5,027,747 * | 7/1991 | Talley | 119/660 |
| 5,113,792 | 5/1992 | Jones et al. | 405/24 |
| 5,176,469 * | 1/1993 | Alsop | 52/162 |
| 5,255,480 | 10/1993 | Alsop | 119/223 |
| 5,309,672 | 5/1994 | Spencer et al. | 405/24 |
| 5,546,895 * | 8/1996 | Brown | 119/622 |
| 5,575,584 | 11/1996 | Alsop | 119/221 |
| 5,639,657 | 6/1997 | Saiki et al. | 119/221 |
| 5,653,193 * | 8/1997 | Marissal | 119/223 |
| 5,669,330 * | 9/1997 | O'Hare | 119/221 |
| 5,871,303 | 2/1999 | Brown, III et al. | 405/25 |
| 5,876,151 | 3/1999 | Brown, III et al. | 405/25 |
| 5,884,585 * | 3/1999 | Streichenberger | 119/221 |
| 6,060,153 * | 5/2000 | McNeil | 119/221 |

* cited by examiner

AQUATIC STRUCTURE AND METHOD

BACKGROUND OF THE INVENTION

The present invention relates to systems for promoting and/or controlling the growth of aquatic species. The present invention also relates to structures and methods for controlling and/or improving the quality of aquatic environments.

Systems for improving aquatic habitats are referred to in U.S. Pat. No. 5,669,330 (O'Hare), U.S. Pat. No. 5,639,657 (Saiki), U.S. Pat. No. 4,950,104 (Streichenberger), U.S. Pat. No. 4,818,579 (Uchida) and U.S. Pat. No. 4,441,453 (McMickle). A floating open ocean farm system is referred to in U.S. Pat. No. 5,309,672 (Spencer). A system for cultivating crustaceans in water is described in U.S. Pat. No. 3,841,266 (Hoshino).

SUMMARY OF THE INVENTION

The present invention relates to a structure for promoting and/or controlling the growth of aquatic species. According to one aspect of the invention, the structure has a buoyant member, a flexible sheet connected to the buoyant member, and flexible strips (such as fronds, ribbons or filaments) connected to the flexible sheet. The flexible sheet may have a high surface area structure for promoting growth of autotrophic organisms in the photic zone. The strips may be arranged to promote the growth of heterotrophic organisms, such as bacteria, beneath the photic zone.

According to another aspect of the invention, the flexible sheet may be suspended from a hollow tube. The tube has sufficient buoyancy to remain at the water surface even as the weight of the flexible sheet and strips increases over time. The flexible materials may become heavier, for example, due to organic and inorganic accumulation on their surfaces. Additional float devices may be provided to ensure that the tube does not become submerged. The additional float devices may be used, for example, where heavy sediment and biological growths accumulate on the structure.

According to a preferred embodiment of the invention, the flexible sheet may be connected to the hollow tube by a flexible sleeve. The sleeve can rotate on the tube so that the sheet does not tend to become wound up on the tube over prolonged use. Preferably, the flexible sheet remains suspended substantially vertically in the photic zone.

The flexible strips may have lowermost free ends that are not connected to each other. Some of the free ends may be anchored to the benthos. Other free ends may be allowed to sway in the water current to form a branched habitat that attracts certain aquatic species. Preferably, the strips have a specific gravity of at least 1.02 so that they do not float upward to the water surface. Ballast devices, such as lead weights or flexible bags filled with ballast material, may be provided for anchoring some of the strips to the water bottom, if desired. If desired, additional anchor devices may be tethered to the ends of the hollow tube. The total height of the aquaculture apparatus is preferably greater than the depth of the water so that the ballast devices and/or anchors reach the benthos.

The present invention also relates to methods of deploying aquaculture structures in water and methods of using such structures to promote the growth and/or accumulation of aquatic species.

In a preferred embodiment of the invention, flexible high surface area structures are used to promote the formation of biofilms. The high surface area structures may be suspended in the respective photic and heterotrophic zones. The high surface area structures may be formed of a variety of materials, including but not limited to, needle-punched spun bond fabric, needle-punched woven scrim flame sealed fabric, open cell foam, batting, and microporous granular particles. The high surface area structures may be provided on or within flexible sheets, panels and/or ribbons. The preferred flexible structures may be formed in a single layer or in multiple side-by-side layers.

An object of the invention is to provide a synthetic aquatic structure that is easy to handle and deploy, and that maintains its biologically active portions at the desired depths in a body of water.

Another object of the invention is to provide a system for generating food, controlling water quality and providing shelter in an aquatic environment.

Another object of the invention is to encourage and support the production of a natural, regenerative food source for successful aquaculture production under a wide variety of conditions. Thus, the present invention may be used to simultaneously provide both food and shelter for aquatic species, for example for aquaculture purposes. By providing food and shelter in the same structure, a viable population of a given aquatic species may be maintained and supported in a concentrated area.

Another object of the invention is to provide a system that can be economically adapted and tailored for different uses and conditions. For example, the growth of sessile and periphytic organisms may be enhanced by selectively modifying the flexible surface structure and/or by providing desired nutrients in the surface structure. In addition, bacteria may be selectively implanted to create desired biological effects in the water.

Other features, objects and advantages of the invention will become apparent from the following detailed description and drawings illustrating preferred embodiments of the invention.

DETAILED DESCRIPTION OF PREFERRED EMBODIMENTS

Figure 1:
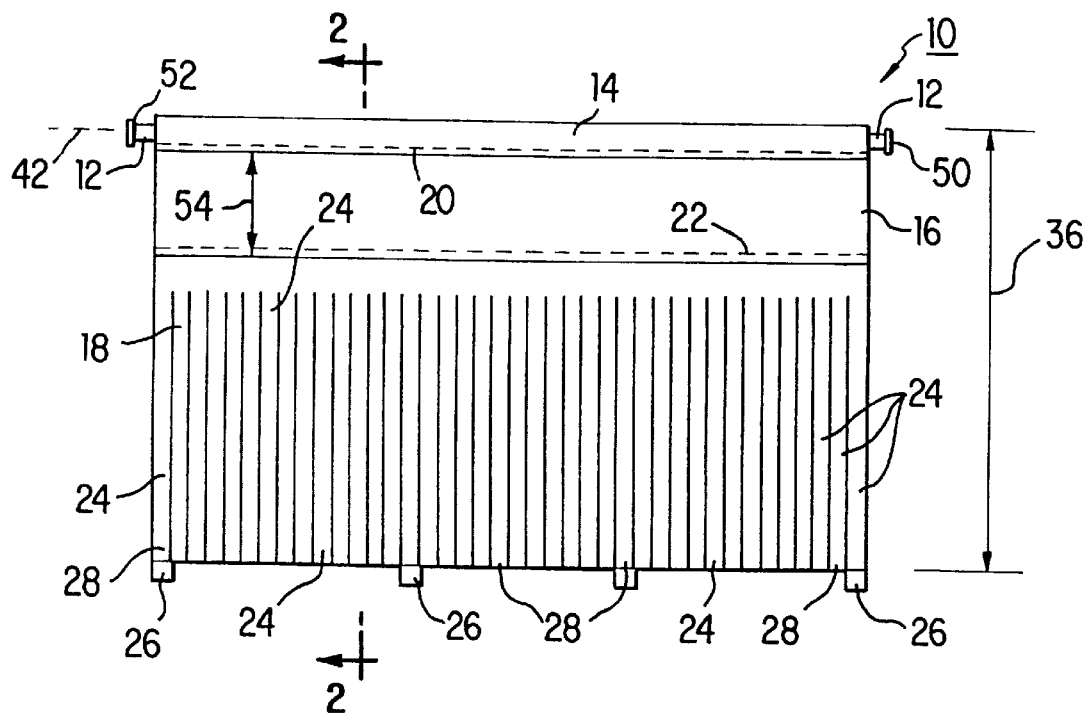
FIG. 1 is a side view of an aquatic structure constructed in accordance with a preferred embodiment of the present invention.
Figure 2:
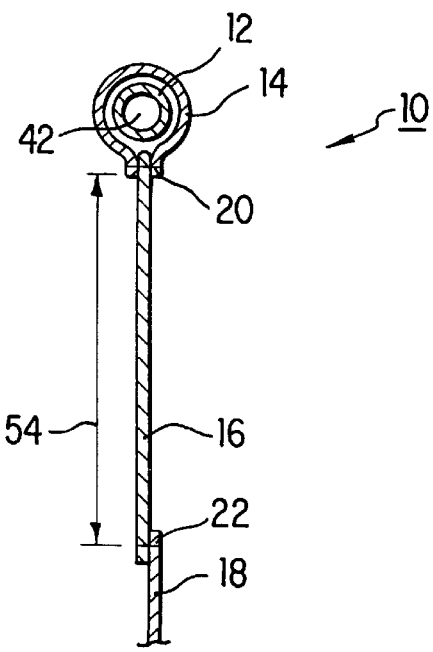
FIG. 2 is a cross-sectional view of the aquatic structure of FIG. 1, taken along line 2—2.
Figure 3:
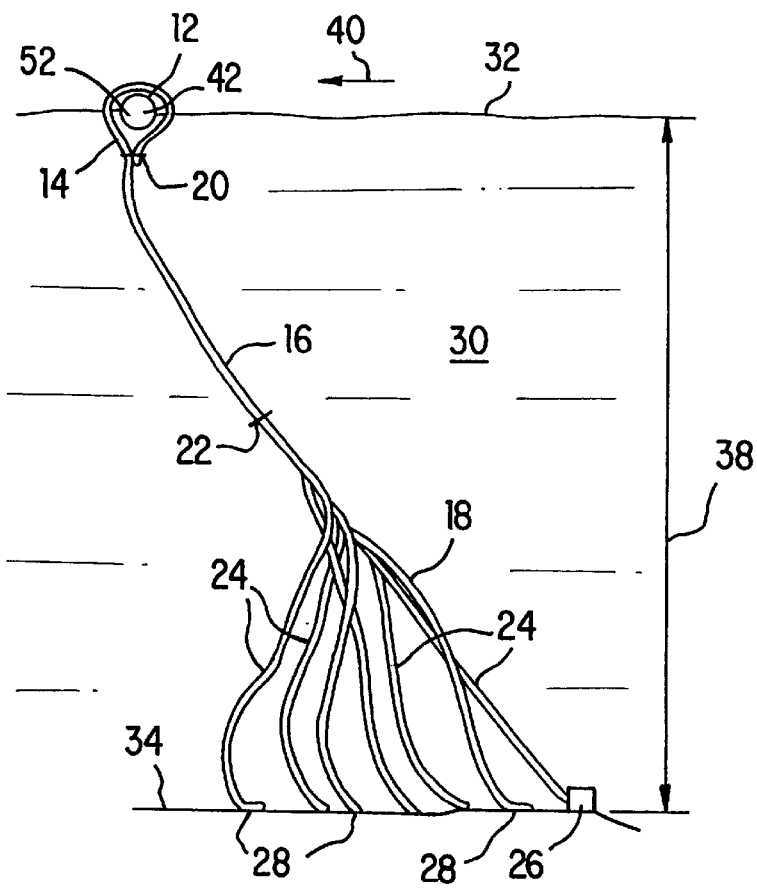
FIG. 3 is an end view of a portion of the aquatic structure of FIG. 1, in a deployed condition.

Referring now to the drawings, where like elements are designated by like reference numerals, FIG. 1 shows an aquatic structure 10 constructed in accordance with a preferred embodiment of the present invention. The aquatic structure 10 has an elongated buoyant member 12, a support sleeve 14, a photic section 16, and a heterotrophic section 18. The buoyant member 12 is surrounded by the sleeve 14. The sleeve 14 is connected to the photic section 16 by stitches 20 or another connection mechanism. The photic section 16 is likewise connected to the heterotrophic section 18 by a suitable mechanism. The heterotrophic section 18 may be subdivided into vertical strips 24 (FIG. 3). As discussed in more detail below, ballast devices 26 (FIG. 1) may be attached to the ends 28 of some or all of the strips 24.

As shown in FIG. 3, the aquatic structure 10 may be deployed in a body of water 30. The specific gravity of the buoyant member 12 is preferably less than that of the water 30. Consequently, the buoyant member 12 and the surrounding sleeve 14 float on the water surface 32. The specific gravity of the photic and heterotrophic sections 16, 18, on the other hand, are greater than 1.0, such that the ends 28 of the strips 24 sink to the benthos 34. The height 36 (FIG. 1) of the aquatic structure 10 may be greater than the depth 38 (FIG. 3) of the water 30.

As a result, the buoyant member 12 may be moved laterally toward or away from the ballast devices 26 by wind 40 or water current. Where possible, the axis 42 of the buoyant member 12 may be oriented transverse or perpendicular to the prevailing wind direction to increase the amount of sunlight that reaches the photic section 16. In addition, the strips 24 may be displaced relative to the buoyant member 12, as discussed in more detail below. The ballast devices 26 operate as anchors to prevent or impede movement of the entire structure 10 with respect the benthos 34.

The aquatic structure 10 may be provided in a variety of sizes and shapes. In the illustrated embodiment, the height 36 of the structure 10 may be in the range of from about 0.5 meters to about 3.0 meters, more preferably in the range of from 0.7 meters to 1.5 meters. The length of the illustrated embodiment (the distance between the ends 50, 52 of the hollow tube 12) may be in the range of from about 0.5 meters to about 10 meters, more preferably in the range of from 1.0 meters to 3.0 meters. The present invention should not be limited, however, to the specific embodiments shown and described in detail herein.

In the illustrated embodiment, the buoyant member 12 is a hollow tube with water-tight caps at opposite ends 50, 52. The tube 12 may be flexible or it may be a rigid pipe. The tube 12 may be formed in one piece or it may be provided with articulated sections. Suitable connectors (not shown) may be provided at the opposite ends 50, 52 for use in handling and/or for connecting the structure 10 in series to other like structures 10. The hollow tube 12 provides sufficient buoyancy to maintain the top portion of the support sleeve 14 above the water surface 32 even after substantial biofilm growths and sessile and periphytic organisms accumulate on the flexible sections 16, 18.

The diameter of the buoyant member 12 may be selected to compensate for the velocity of the wind and/or water impinging on the support sleeve 14. In a preferred embodiment, the diameter of the tube 12 may be in the range of from about 1.0 centimeters (cm) to about 7.0 cm, more preferably in the range of from 2.0 cm to 5.0 cm. In an alternative embodiment of the invention, the buoyant member 12 may be in the form of a solid or flexible rod of buoyant foam plastic material.

The support sleeve 14 may be formed of a flexible sheet wrapped around the buoyant member 12. The diameter of the support sleeve 14 should be sufficient to allow the buoyant member 12 to be slipped through and capped. The caps at the ends 50, 52 of the tube 12 may be used to prevent the tube 12 from slipping out of the sleeve 14. The sleeve material 14 should have high tensile strength and excellent resistance to ultraviolet (uv) radiation. The sleeve 14 may be exposed to solar radiation at the water surface 32 for long periods of time (three to four years or more). The support sleeve 14 may be formed, for example, of woven polyethylene, having a 12×10.5 weave scrim coated with 1.75 mils of polyethylene on both sides. The sleeve 14 may be colored or provided with a visible pattern or indicia for aesthetics and/or to locate the structure 10 on the water surface 32.

The photic section 16 may be formed of fabric or another suitable flexible, synthetic material. The fabric 16 preferably constitutes a synthetic high surface area structure to encourage and support the growth of algae and/or other autotrophic organisms. The height 54 of the photic section 16 (FIG. 1) is such that all or most of the photic section 16 is suspended within the photic zone of the water 30 in use. Thus, in the illustrated embodiment, the height 54 of the photic section 16 is about 0.3 meters. Autotrophs become attached to the photic section 16 and undergo photosynthesis to provide nutrients for other organisms in the water 30.

The photic section 16 may be formed, for example, of needle-punched polyester spun bond fabric with a surface area of 55 square meters per square meters of fabric ($m^2/m^2$). Other flexible high surface area structures, including open cell foam, or spun batting, microporous granular particles on a flexible substrate, and dense felt, may also be used to form the photic section 16. In general, the photic section 16 may be formed of any of the high surface area structures described in International (PCT) Patent Application Publication No. WO 99/17605. The entire disclosure of International Application Publication No. WO 99/17605, published Apr. 15, 1999, is incorporated herein by reference.

The illustrated photic section 16 may have a surface area of from about 2.0 $m^2/M^2$ to about 100 $m^2/M^2$. In a preferred embodiment of the invention, the photic section 16 has a surface area of from 20 $m^2/m^2$ to 75 $m^2/m^2$. The pore size distribution of the photic section 16 may be in a range of from about 25 microns ($\mu m$) to about 10,000 $\mu m$, more preferably in the range of from 100 $\mu m$ to 1,000 $\mu m$. The flexible material 16 should preferably have excellent long term resistance to uv radiation.

The heterotrophic section 18 may be formed of a flexible sheet material having a high effective surface area. The section 18 may also be provided with suitable physical and/or chemical characteristics (wetting surface contact angle, ionization potential, etc.). The flexible material 18 is arranged to allow and/or encourage colonization by heterotrophs and/or other aquatic species.

The strips (which may be in the form of ribbons, strands, fronds or filaments) 24 may be formed by parallel cuts through the fabric of the heterotrophic section 18. The strips 24 may be formed before or after the heterotrophic section 18 is attached to the photic section 16. The strips 24 should preferably be formed before the structure 10 is deployed in the water 30. In operation, water current causes the strips 24 to disperse and separate from each to form a moving branched structure that resembles the lower portion of a tupelo tree. The dispersed and partially intertwined strips 24 sway back and forth in the water 30 to provide an attractive habitat (shade and predation shelter) for fish and other aquatic species. The movement of the branched structure 24 also promotes biomasss transfer of nutrients with the water 30.

The widths of the strips 24 may be, for example, in the range of from about 5 millimeters (mm) to about 100 mm, more preferably in the range of from 10 mm to 25 mm.

As noted above, the flexible strips 24 tend to sink gradually to the benthos 34 in use. In a preferred embodiment of the invention, the specific gravity of the photic and heterotrophic sections 16, 18 is in a range of from about 1.02 to about 1.50. Even more preferably, the specific gravity of the fabric sections 16, 18 is in the range of from 1.05 to 1.25.

The heterotrophic section 18 (including the strips 24) may have a surface area in the range of from about 25 $m^2/m^2$ to about 400 $m^2/m^2$, more preferably in a range from 120 $m^2/m^2$ to 320 $m^2/m^2$. The pore size distribution of the heterotrophic section 18 should be in the range of from about 2 $\mu$m to about 250 $\mu$m, more preferably in the range of from 5 $\mu$m to 50 $\mu$m. The flexible heterotrophic material 18 may be composed of a polymeric material of sufficient molecular weight to assure its stability when exposed to high levels of microbiological activity.

In a preferred embodiment of the invention, the material for the heterotrophic section 18 (including the strips 24) may be formed of needle-punched woven polyester (flame sealed) with a surface area of about 60 $m^2/m^2$ and an average pore size of about 89 $\mu$m. The heterotrophic material 18 may alternatively include any of the high surface area structures described in International Application Publication No. WO 99/17605.

The ballast devices 26 may be formed of metal (such as lead) or another suitable, durable material. The weights 26 may be clamped to the lower ends 28 of the strips 24. The weight of each ballast device 26 may be in the range of from about 100 grams to about 1,000 grams, more preferably in the range of from 200 grams to 400 grams. The aggregate weight of all the ballast devices 26 for each structure 10 may be, for example, in the range of from about 1.0 kilograms (kg) to about 10 kilograms (kg)/linear meter of the structure 10, more preferably in the range of from 3.0 to 5.0 kg/linear meter.

The ballast devices 26 may be clamped or stitched to the free ends 28 of the strips 24. The weights 26 may be attached to selected ones of the strips 24 and spaced apart along the length of the structure 10. In an alternative embodiment, each weight 26 may be clamped to more than one strip 24.

In an alternative embodiment of the invention, the ballast devices 26 may be in the form of flexible bags or small containers. The bags 26 may be formed of woven polypropylene or another suitable material. According to this embodiment of the invention, the apparatus 10 may be transported with the bags or containers empty. Then the bags or containers 26 may be filled with sand, gravel or another suitable ballast material, including granular material that may be readily available at the water site. And then the apparatus 10 may be deployed in the water 30. This way, the ballast material does not have to transported as part of the apparatus 10, which makes it easier to transport and handle the apparatus 10. The filled ballast devices 26 may have the appearance of bean bags, for example.

The flexible ballast devices 26 may be connected to the ends 28 of the strips 24 by a variety of suitable connection means (not shown), including but not limited to stitches, clips, clamps, staples and flexible ties. The strips 24 and the connection means should be sufficiently durable to withstand the repeated jerking forces created by the buoyant tube 12 bobbing up and down on waves (not shown) on the water surface 32. Thus, forming the ballast devices 26 of flexible bags filled with granular material has the advantage of not forming a rigid discrete weight at the connection point to the end 28 of the strip 24. The flexible ballast devices 26 can be connected to the strips 24 without the tensile stress concentrations that would be associated with attaching a solid metal weight to the strip ends 28.

Figure 4:
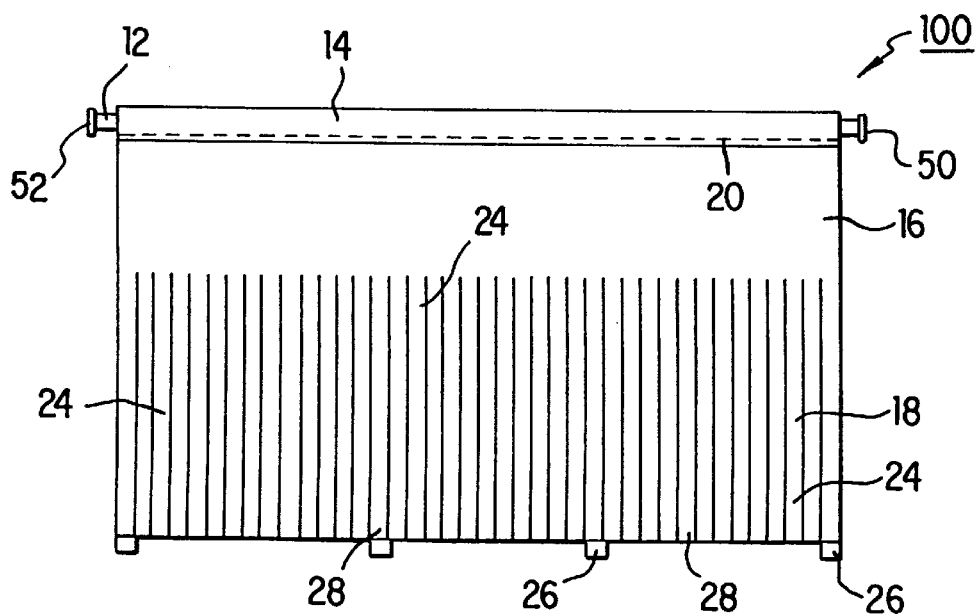
FIG. 4 is a side view of another aquatic structure constructed in accordance with the present invention.

In an alternative embodiment of the invention, as shown in FIG. 4, the sleeve 14 and the photic and heterotrophic sections 16, 18 are formed in one piece of a single sheet of flexible material. That is, the aquatic structure 100 may be constructed without the second row of stitches 22, and the photic and heterotrophic sections 16, 18 may be formed of the same material. Constructing the apparatus 100 from a single sheet of material 16, 18 attached to the sleeve 14 may be advantageous in terms of reducing the cost of manufacture and installation, even though the biological growth performance of the apparatus may be less than optimum. According to an alternative embodiment of the invention, the sleeve and the photic and heterophotic sections all may be constructed as an integral unit from a single piece of flexible material.

Figure 5:
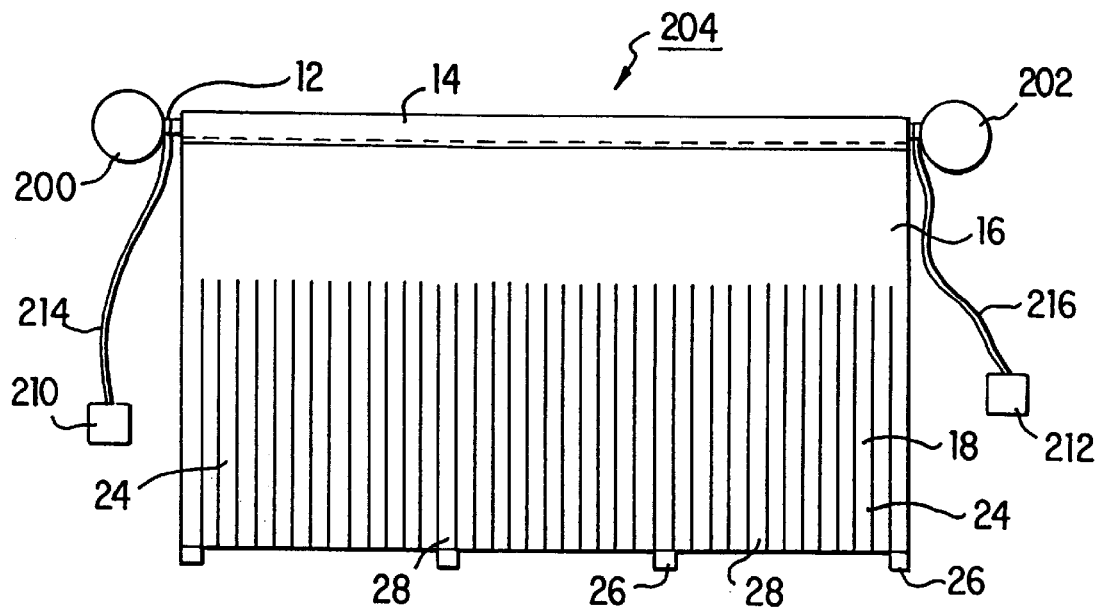
FIGS. 5 and 6 are a side view and an end view, respectively, of yet another aquatic structure constructed in accordance with the present invention.
Figure 6:
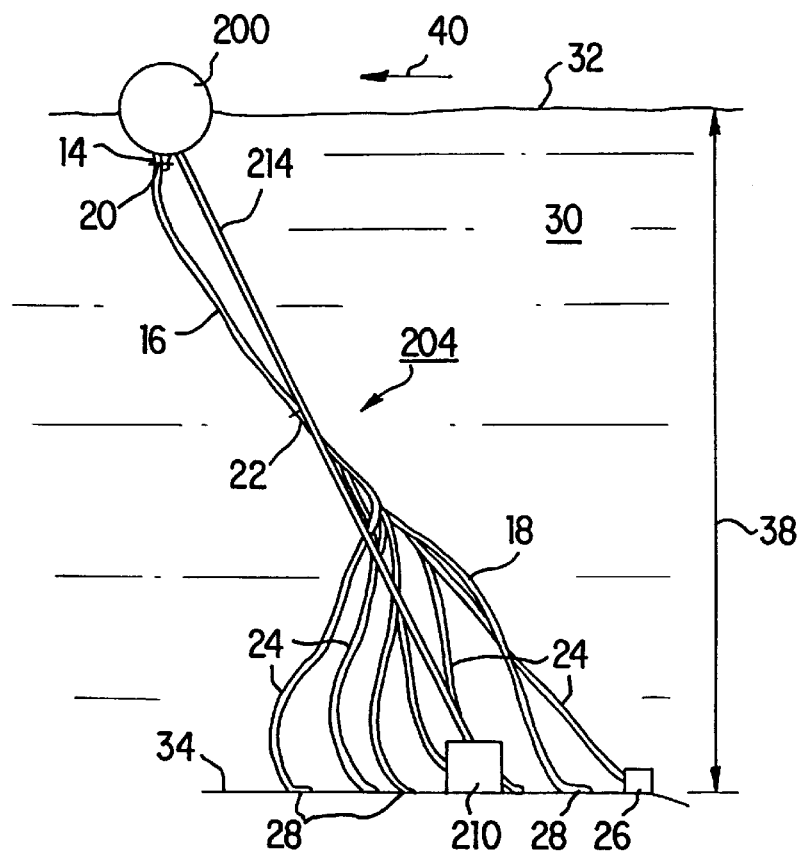

In yet another alternative embodiment of the invention, as shown in FIGS. 5 and 6, additional float devices 200, 202 are attached to the ends of the buoyant member 12. The float devices 200, 202 may be inflatable or they may be formed of closed cell foam material or other suitable materials. The float devices 200, 202 provide additional buoyancy for the apparatus 204 to ensure that the photic section 16 remains in the photic zone even when large amounts of sediment or biological material accumulate on the underwater portions 16, 18. The float devices 200, 202 may be attached to the buoyant member 12 before the apparatus 204 is first installed in the water 30. Alternatively, the float devices 200, 202 may be attached to the buoyant member 12 after the apparatus 204 has been employed in the water 30 for some time. Thus, the float devices 200, 202 may be connected to the apparatus 204 in response to a determination that sediment conditions, biological growth conditions and/or water current would otherwise cause the buoyant member 12 to be submerged beneath the water surface 32. The float devices 200, 202 are preferably formed of a durable, uv radiation-resistant material.

As shown in FIGS. 5 and 6, anchors 210, 212 may also be provided for securing the apparatus 204 to the benthos 34. The anchors 210, 212 may be formed of concrete or cement blocks or another suitable material. The anchors 210, 212 may be connected to the ends 50, 52 of the buoyant member 12 by suitable tethers (or ropes, chains or cables) 214, 216. The tethers 214, 216 are preferably shorter than the height 36 of the apparatus 204, such that the ends 28 of the flexible strips 24 reach the benthos 34 in use. The anchors 210, 212 may be useful in situations involving high wind 40 or water currents, where the weight of the ballast devices 26 and/or the tensile strength of the strips 24 would be insufficient to maintain the apparatus 204 in the desired location.

The anchors 210, 212 may be employed with or without the additional float devices 200, 202. The float devices 200, 202 may be employed with or without the anchors 210, 212. The anchors 210, 212 and/or the float devices 200, 202 may be employed with the composite structure 10 of FIG. 1 and/or the unitary structure 100 shown in FIG. 4.

According to an alternative embodiment of the invention, the apparatus 10 of FIG. 1 may be deployed with no ballast devices 26 of any kind. The ballast devices may not be needed or desirable in certain environments. For example, the ballast devices may not be needed in hatchery tanks or small ponds that are protected by high dikes and experience static wind and flow conditions. According to this aspect of the invention, the strips 24 sink to the benthos 34 on their own and are allowed to sway gently to and fro beneath the photic section 16. The strips 24 sink because they are slightly more dense than the surrounding water 30. The bottom ends 28 of the strips 24 may gradually become separated from each other to form a branched habitat for aquatic species. In environments where no ballasts or anchors are employed, it may be desirable to tie the ends of the buoyant tube 12 to the sides of the hatchery tank, for example.

In operation, to deploy the structure 10, 100, 204, the flexible material 16, 18 may be wound around or folded against the buoyant member 12. Then the structure 10, 100, 204 is lowered into the water 30 from a boat (not shown) or from the edge of the water 30. The weights 26 automatically unwind or unfurl the flexible material 16, 18 from the buoyant member 12, and the wind 40 and water current cause the individual strips 24 to move away from each other in the manner shown in FIGS. 3 and 6. The anchors 210, 212 may be deployed before the flexible material 16, 18 is fully deployed in the water 30, especially in high wind or current conditions where the anchors 210, 212 are necessary to ensure that the apparatus 204 is deployed in the desired location and/or orientation.

If desired, the ends 50, 52 of the structure 10, 100, 204 may be connected to other like structures 10, 100, 204 or to suitable ropes or cables. Alternatively, the structure 10, 100, 204 may be maintained in place by itself solely by the weights 26 resting on the benthos 34. Over time, biological growth accumulates on the fabric sheets and strips 16, 18. Photosynthetic processes are supported on the photic section 16. Food development and colonization by heterotrophs is encouraged and supported on and among the branched flexible strips 24. If desired, the aquatic structure 10, 100, 204 may be removed, discarded and/or cleaned and returned to the water 30.

The body of water 30 may be seawater, freshwater or other aquatic systems and environments. In a preferred embodiment of the invention, the water 30 may be defined within an aquaculture sea pen (not illustrated). In another embodiment of the invention, the water 30 may contain excessive nutrients, such as nitrogen and phosphorous, and or heavy metals, and the flexible materials 16, 18 may be formulated to encourage growth of specific autotrophs and heterotrophs to remove or to concentrate the excess nutrients and/or heavy metals from the water 30.

The materials used in the aquatic structure 10, 100, 204 should preferably be composed of polymers which do not leach harmful chemicals into the environment, and which do not decompose in water (including seawater) and sunlight. The aquatic structure may be used for long periods of time and may be cleaned, reused and/or transported. If desired, the flexible sections 16, 18 may include one or more additional layers (not illustrated) or materials for reinforcing, preserving or protecting the aquatic structure.

An advantage of the illustrated structure 10, 100, 204 is that it is relatively light weight, flexible and easy to handle. The structure may be installed in the water 30 with little or no special equipment. Divers are not needed to anchor the structure to the benthos 34.

Over time, the growth of biofilm and the attachment of organisms to the flexible materials 16, 18 gradually reduces the overall buoyancy of the structure 10, 100, 204. However, as the overall buoyancy is reduced, the tube 12 does not sink deeper into the water 30. The buoyant tube 12 remains at the water surface 32 to maintain the photic section 16 in the photic zone to receive sunlight for efficient photosynthetic development of nutrients.

The above descriptions and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the claimed invention.

What is claimed is:

1. An aquatic structure for promoting biological growth, said structure comprising:
   a buoyant member;
   a flexible sheet connected to said buoyant member, said sheet having a high surface area structure for promoting growth of autotrophic organisms in a photic zone; and
   flexible strips connected to said flexible sheet, said flexible strips being arranged to promote growth of heterotrophic organisms.

2. The structure of claim 1, wherein said buoyant member includes a hollow tube.

3. The structure of claim 2, further comprising a flexible sleeve for connecting said flexible sheet to said hollow tube.

4. The structure of claim 3, further comprising stitches for connecting said flexible strips to said flexible sheet.

5. The structure of claim 4, wherein said strips and said sheet are formed of different materials.

6. The structure of claim 3, wherein said strips and said flexible sheet are integrally formed of a single sheet of fabric.

7. The structure of claim 3, wherein said strips extend downwardly into the water in use, and said hollow tube extends horizontally across the surface of the water.

8. The structure of claim 7, wherein said strips have free ends that are not connected to each other.

9. The structure of claim 8, wherein said strips have a specific gravity that is greater than or equal to 1.02.

10. The structure of claim 9, wherein said structure has no ballast device, and wherein said strips are not anchored to the benthos.

11. The structure of claim 9, wherein said strips are movable with respect to each other to form an underwater branched habitat for aquatic species.

12. An aquatic structure for promoting biological growth, said structure comprising:
    a buoyant member;
    a flexible sheet connected to said buoyant member, said sheet having a high surface area structure for promoting growth of autotrophic organisms in a photic zone; and
    flexible strips connected to said flexible sheet, said flexible strips being arranged to promote growth of heterotrophic organisms; and
    wherein said buoyant member includes a hollow tube, and wherein said aquatic structure further comprises a flexible sleeve for connecting said flexible sheet to said hollow tube, and wherein said strips extend downwardly into the water in use, and said hollow tube extends horizontally across the surface of the water, and wherein said strips have free ends that are not connected to each other, and wherein said strips have a specific gravity that is greater than or equal to 1.02, and wherein said aquatic structure further comprises ballast devices for anchoring one or more of said strips to the benthos.

13. The structure of claims 12, wherein said ballast devices include metal weights attached to one or more of said free ends of a first group of said strips.

14. An aquaculture apparatus, comprising:
    an elongated buoyant device arranged to float on the water surface;
    flexible material having a high surface area structure for promoting aquatic growth, said flexible material having a specific gravity greater than or equal to 1.02, said flexible material being connected to said elongated buoyant device; and at least one ballast device for anchoring said aquaculture apparatus, said ballast device being connected to said flexible material.

15. The apparatus of claim 14, wherein said flexible material includes a flexible sheet and flexible strips, said sheet being located between said buoyant device and said strips.

16. The apparatus of claim 15, wherein said strips extend downwardly toward the benthos in use, and said buoyant device floats in a horizontal position on the surface of the water.

17. The apparatus of claim 16, wherein said strips have free ends that are not connected to each other.

18. The apparatus of claim 17, wherein said ballast device is connected to at least one of said free ends.

19. The apparatus of claim 18, wherein said ballast device is formed of flexible material and contains granular material.

20. The apparatus of claim 14, further comprising float devices located at the ends of said elongated buoyant device.

21. The apparatus of claim 14, further comprising anchors tethered to the ends of said elongated buoyant device.

22. An aquaculture method, comprising the steps of:

floating a buoyant device on the surface of a body of water;

suspending a flexible sheet from said buoyant device in said body of water;

suspending flexible strips from said flexible sheet; and subsequently, promoting growth of autotrophic and heterotrophic aquatic organisms on said flexible sheet and said flexible strips.

23. The method of claim 22, further comprising the step of resting free ends of said flexible strips on the bottom of said body of water.

24. The method of claim 23, further comprising the step of moving said free ends relative to each other to form a branched underwater habitat.

25. The method of claim 24, further comprising the step of growing heterotrophic organisms within said habitat.

26. The method of claim 24, further comprising the step of providing float devices at opposite ends of said buoyant device.

27. The method of claim 22, further comprising the step of tethering anchors to said buoyant device.

28. An aquaculture method, comprising the steps of:

floating a buoyant device on the surface of a body of water;

suspending a flexible sheet from said buoyant device in said body of water;

suspending flexible strips from said flexible sheet; and subsequently, promoting growth of autotrophic and heterotrophic aquatic organisms on said flexible sheet and said flexible strips; and wherein said method further comprises the step of resting free ends of said flexible strips on the bottom of said body of water, and wherein said method further comprises the step of anchoring a first group of said free ends to said bottom.

29. The method of claim 28, further comprising the step of forming ballast devices by adding ballast material to flexible ballast containers.

30. An aquaculture apparatus, comprising:

an elongated buoyant device arranged to float on the water surface; and flexible sheet material hanging from said elongated buoyant device, said flexible sheet material having a high surface area structure for promoting aquatic growth, said flexible sheet material having a specific gravity greater than or equal to 1.02, and said flexible sheet material being connected to said elongated buoyant device.

31. The apparatus of claim 30, wherein said flexible sheet material includes a flexible sheet and flexible strips, said sheet being located between said buoyant device and said strips.

32. The apparatus of claim 31, wherein said strips have first ends that are not connected to each other, and second ends that are contiguous with said sheet.

* * * * *